United States Patent
Morinaga et al.

(10) Patent No.: US 11,119,190 B2
(45) Date of Patent: Sep. 14, 2021

(54) AXIAL-MISALIGNMENT ESTIMATING DEVICE

(71) Applicant: DENSO CORPORATION, Kariya (JP)

(72) Inventors: Mitsutoshi Morinaga, Kariya (JP); Takuya Takayama, Kariya (JP); Chiharu Yamano, Tokyo (JP)

(73) Assignee: DENSO CORPORATION, Kariya (JP)

( * ) Notice: Subject to any disclaimer, the term of this patent is extended or adjusted under 35 U.S.C. 154(b) by 350 days.

(21) Appl. No.: 16/335,820

(22) PCT Filed: Sep. 25, 2017

(86) PCT No.: PCT/JP2017/034553
§ 371 (c)(1),
(2) Date: Mar. 22, 2019

(87) PCT Pub. No.: WO2018/056441
PCT Pub. Date: Mar. 29, 2018

(65) Prior Publication Data
US 2019/0219673 A1 Jul. 18, 2019

(30) Foreign Application Priority Data
Sep. 26, 2016 (JP) ............... JP2016-186893

(51) Int. Cl.
*G01S 7/40* (2006.01)
*G01S 13/931* (2020.01)

(52) U.S. Cl.
CPC .............. *G01S 7/4026* (2013.01); *G01S 7/40* (2013.01); *G01S 13/931* (2013.01); *G01S 7/403* (2021.05)

(58) Field of Classification Search
CPC .......... G01S 7/40; G01S 7/4026; G01S 7/403; G01S 7/4034; G01S 13/931
See application file for complete search history.

(56) References Cited

U.S. PATENT DOCUMENTS

| | | | | |
|---|---|---|---|---|
| 5,832,407 A | * | 11/1998 | Kai ...................... | G01S 7/4972 701/466 |
| 5,964,822 A | * | 10/1999 | Alland ................. | G01S 17/931 701/301 |
| 5,977,906 A | * | 11/1999 | Ameen ................. | G01S 13/931 342/174 |
| 6,025,797 A | * | 2/2000 | Kawai ................... | G01S 17/931 342/70 |

(Continued)

FOREIGN PATENT DOCUMENTS

JP 4665903 B2 4/2011

*Primary Examiner* — Peter M Bythrow
(74) *Attorney, Agent, or Firm* — Maschoff Brennan

(57) ABSTRACT

An acquiring unit acquires, for each of reflection points detected by a radar device, reflection point information including a horizontal angle, a vertical angle, and a relative speed. A converting unit converts each of the reflection points into three-dimensional coordinates. An extracting unit extracts stationary reflection points from the reflection points. An estimating unit uses a relational expression established among unknown parameters including a traveling direction vector and a moving speed of a moving body, three-dimensional coordinates of each of the stationary reflection points, and a relative speed of the stationary reflection point, to estimate the known parameters. A calculating unit determines an axial misalignment angle from the estimated unknown parameters.

4 Claims, 4 Drawing Sheets

(56) References Cited

U.S. PATENT DOCUMENTS

| | | | | |
|---|---|---|---|---|
| 6,246,949 B1* | 6/2001 | Shirai | ................ | B60K 31/0008 701/96 |
| 6,896,082 B2* | 5/2005 | Asanuma | ............. | G01S 13/931 180/169 |
| 7,545,313 B2* | 6/2009 | Okamura | ............. | G01S 7/4026 342/173 |
| 7,813,851 B2* | 10/2010 | DeMersseman | ....... | G01B 21/24 701/30.5 |
| 8,581,776 B2* | 11/2013 | Tsunekawa | ............. | G01S 13/58 342/70 |
| 8,781,706 B2* | 7/2014 | Cund | ................... | G01S 13/584 701/96 |
| 9,618,616 B2* | 4/2017 | Kishigami | ................ | G01S 7/40 |
| 10,088,553 B2* | 10/2018 | Zeng | ...................... | G01S 13/87 |
| 2002/0138223 A1* | 9/2002 | Schneider | ............. | G01S 7/4026 702/104 |
| 2003/0034913 A1* | 2/2003 | Asanuma | ............. | G01S 7/4026 342/70 |
| 2004/0066325 A1* | 4/2004 | Zoratti | ................. | G01S 7/4026 342/165 |
| 2004/0217899 A1* | 11/2004 | Kikuchi | ................ | G01S 13/931 342/75 |
| 2005/0024261 A1* | 2/2005 | Fujita | .................... | G01S 7/4026 342/174 |
| 2005/0285778 A1* | 12/2005 | Shinagawa | ........... | G01S 7/4026 342/173 |
| 2007/0115169 A1* | 5/2007 | Kai | ...................... | G01S 7/4026 342/174 |
| 2007/0182623 A1* | 8/2007 | Zeng | ..................... | G01S 13/723 342/174 |
| 2008/0012752 A1* | 1/2008 | Okamura | ............. | G01S 7/4026 342/165 |
| 2011/0068970 A1* | 3/2011 | Mitsumoto | ........... | G01S 13/931 342/70 |
| 2012/0242531 A1* | 9/2012 | Itoh | ...................... | G01S 13/931 342/107 |
| 2013/0218398 A1* | 8/2013 | Gandhi | .................. | G01S 13/58 701/31.1 |
| 2015/0276923 A1* | 10/2015 | Song | ..................... | G01S 7/4026 702/97 |
| 2016/0223661 A1* | 8/2016 | Song | ..................... | G01S 13/60 |
| 2017/0261599 A1* | 9/2017 | Zeng | ..................... | G01S 7/4026 |

* cited by examiner

AXIAL-MISALIGNMENT ESTIMATING DEVICE

CROSS REFERENCE TO RELATED APPLICATION

The present application is a national stage application of PCT Application No. PCT/JP2017/034553, filed on Sep. 25, 2017, which claims priority based on Japanese Patent Application No. 2016-186893 filed to the Japanese Patent Office on Sep. 26, 2016, the entire contents of which are incorporated herein by reference. Also, any applications for which a foreign or domestic priority claim is identified in the Application Data Sheet as filed with the present application are hereby incorporated by reference under 37 CFR 1.57.

TECHNICAL FIELD

The present disclosure relates to a technique for estimating an axial misalignment angle of a radar device detecting an azimuth of a target and a relative speed.

BACKGROUND ART

In an in-vehicle radar device, if an installation state thereof is changed for any reason, and if so-called axial misalignment occurs, that is a misalignment of a center axis for a radar beam, a large detection error may occur and cause a position of an object or the like to be erroneously detected. PTL 1 described below discloses, as a method for detecting such axial misalignment, a technique for estimating axial misalignment angle of the radar device in a horizontal direction based on a distribution of relative speeds and azimuth angles observed for a plurality of reflection points.

CITATION LIST

Patent Literature

[PTL 1] JP 4665903 B

SUMMARY OF THE INVENTION

However, as a result of studies conducted by the inventors, it has been found that the conventional device described in PTL 1 is precluded from estimating axial misalignment in a vertical direction. A device for horizontal axial misalignment and a device for vertical axial misalignment may be prepared. In this case, however, axial misalignments of the two axes are individually estimated, thus preventing accurate estimation.

An aspect of the present disclosure desirably provides a technique for improving estimation accuracy for axial misalignment angles in a horizontal direction and a vertical direction.

An axial-misalignment estimating device according to an aspect of the present disclosure estimates an axial misalignment angle of a radar device mounted to a moving body. The axial-misalignment estimating device includes an acquiring unit, a converting unit, an extracting unit, an estimating unit, and a calculating unit.

The acquiring unit acquires, for each of reflection points detected by the radar device, reflection point information including a horizontal angle and a vertical angle determined relative to a beam direction that is along a center axis of a radar beam from the radar device, and a relative speed of a reflection point relative to the moving body. The converting unit converts, based on the reflection point information acquired by the acquiring unit, each of the reflection points into three-dimensional coordinates representing a horizontal distance and a vertical distance on a plane orthogonal to the beam direction and a distance in the beam direction when a distance to the reflection point is assumed to be 1, the horizontal and vertical distances being determined from the horizontal angle and the vertical angle. The extracting unit extracts, from the reflection points, stationary reflection points estimated to be stationary objects. The estimating unit estimates unknown parameters including a traveling direction vector representing a traveling direction of the moving body and a moving speed of the moving body, using a relational expression established between the unknown parameters and the three-dimensional coordinates of each of the stationary reflection points resulting from the conversion by the converting unit and the relative speed of the stationary reflection point acquired by the acquiring unit. The calculating unit determines axial misalignment angles in a horizontal direction and a vertical direction based on the traveling direction vector included in the unknown parameters estimated by the estimating unit.

In other words, the three-dimensional coordinates normalized with the distance to the reflection point assumed to be 1 represent a unit vector (hereinafter referred to as reflection point vector) representing an azimuth where the reflection point is present. The relational expression indicates that a difference between the reflection point vector and the traveling direction vector leads to variation of a magnitude of the relative speed detected for the stationary reflection point from a magnitude of a moving speed of the moving body. The three-dimensional coordinates and the relative speed for the detected stationary reflection point are applied to the relational expression to generate simultaneous equations. Solving the simultaneous equations enables the unknown parameters to be estimated, and thus allows simultaneous estimation of the axial misalignment angles in the horizontal direction and the vertical direction.

The bracketed reference signs in the claims indicate correspondence with the specific means described in the following embodiment as a mode, and should not limit the technical scope of the present disclosure.

DESCRIPTION OF THE EMBODIMENTS

Figure 1:
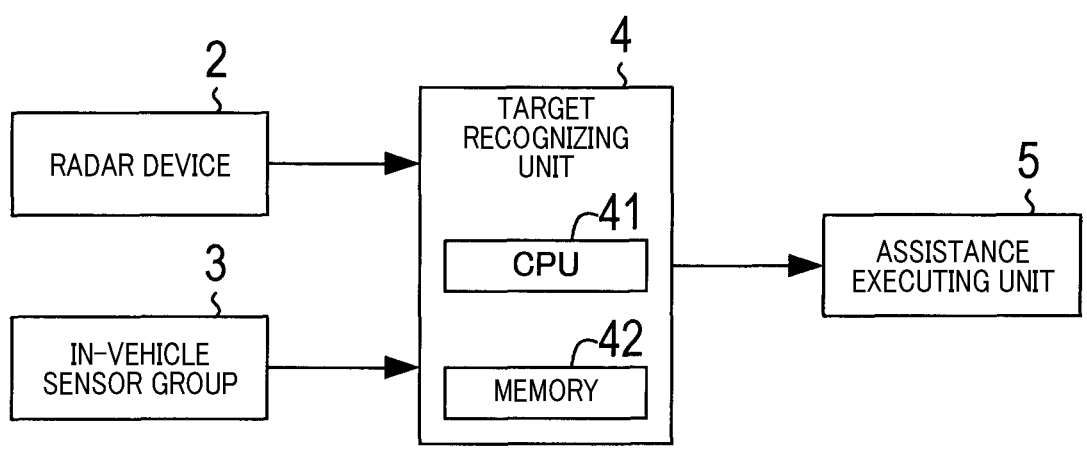
FIG. 1 is a block diagram illustrating a configuration of a vehicle control system.

Referring to the drawings, a description will be given of an embodiment of the present disclosure.

1. Configuration

A vehicle control system 1 illustrated in FIG. 1 includes a radar device 2, an in-vehicle sensor group 3, a signal processing unit 4, and an assistance executing unit 5. A vehicle equipped with the vehicle control system 1 is hereinafter referred to as own vehicle. A vehicle width direction of the vehicle is hereinafter referred to as horizontal direction, and a vehicle height direction of the vehicle is hereinafter referred to as vertical direction.

The radar device 2 radiates a radar wave within a predetermined range of angles and receives a resultant reflected wave to generate reflection point information about a reflection point reflecting the radar wave. The radar device 2 may be what is called a millimeter-wave radar using an electromagnetic wave in a millimeter-wave band as a radar wave, a laser radar using laser light as a radar wave, or a sonar using a sound wave as a radar wave. In any of the radar devices, an antenna unit transmitting and receiving the radar wave is configured to be capable of detecting a direction of arrival of the reflected wave both in the horizontal direction and in the vertical direction.

The radar device 2 is mounted such that a beam direction that is a direction along a center axis direction of a radiated radar beam coincides with a traveling direction of the own vehicle. The radar device 2 is used to detect various targets present ahead of the own vehicle. The reflection point information generated by the radar device 2 includes at least an angle in the horizontal direction and an angle in the vertical direction, at which the reflection point is present, and a relative speed relative to the reflection point. The angle in the horizontal direction and the angle in the vertical direction are determined relative to the beam direction.

The in-vehicle sensor group 3 includes a plurality of sensors mounted to the vehicle to detect a state of the vehicle and the like. The sensors constituting the in-vehicle sensor group 3 include at least a vehicle speed sensor detecting a vehicle speed based on rotation of wheels.

The signal processing unit 4 includes a microcomputer including a CPU 41 and a semiconductor memory such as a RAM or a ROM (hereinafter referred to as memory 42). Functions of the signal processing unit 4 are implemented by the CPU 41 by executing a program stored in a non-transitory computer-readable storage medium. In this example, the memory 42 corresponds to the non-transitory computer-readable storage medium in which the program is stored. With this program being executed, a method corresponding to the program is implemented. The signal processing unit 4 may include one or more microcomputers. A technique for implementing the functions of the signal processing unit 4 is not limited to software, and some or all of the functions may be implemented using one or more pieces of hardware. For example, if the functions are implemented by an electronic circuit that is hardware, the electronic circuit may be implemented by a digital circuit, or an analog circuit, or a combination thereof.

The signal processing unit 4 executes at least a target recognizing process and an axial-misalignment estimating process. The target recognizing process involves detecting at least one of the lanes where the own vehicle travels, a preceding vehicle traveling in the same lane as to the own vehicle, other vehicles, obstacles and the like, based on the reflection point information obtained from the radar device 2 and the information obtained from the in-vehicle sensor group 3. The result of the target recognizing process is provided to the assistance executing unit 5 and the like. The axial-misalignment estimating process involves detecting an axial misalignment angle of the beam direction of the radar device 2 with respect to the traveling direction of the vehicle. The axial-misalignment estimating process will be described below in detail. The signal processing unit 4 executing the axial-misalignment estimating process corresponds to an axial-misalignment estimating device.

The assistance executing unit 5 controls various in-vehicle devices to execute predetermined driver assistance, based on the result of the target recognizing process executed by the signal processing unit 4. The in-vehicle devices to be controlled include a monitor displaying various images, and an auditory device outputting an alarm sound and a guidance voice. The in-vehicle devices to be controlled include a control device controlling at least one of an internal combustion engine, a power train mechanism, and a brake mechanism, of the own vehicle.

2. Processing

Figure 2:
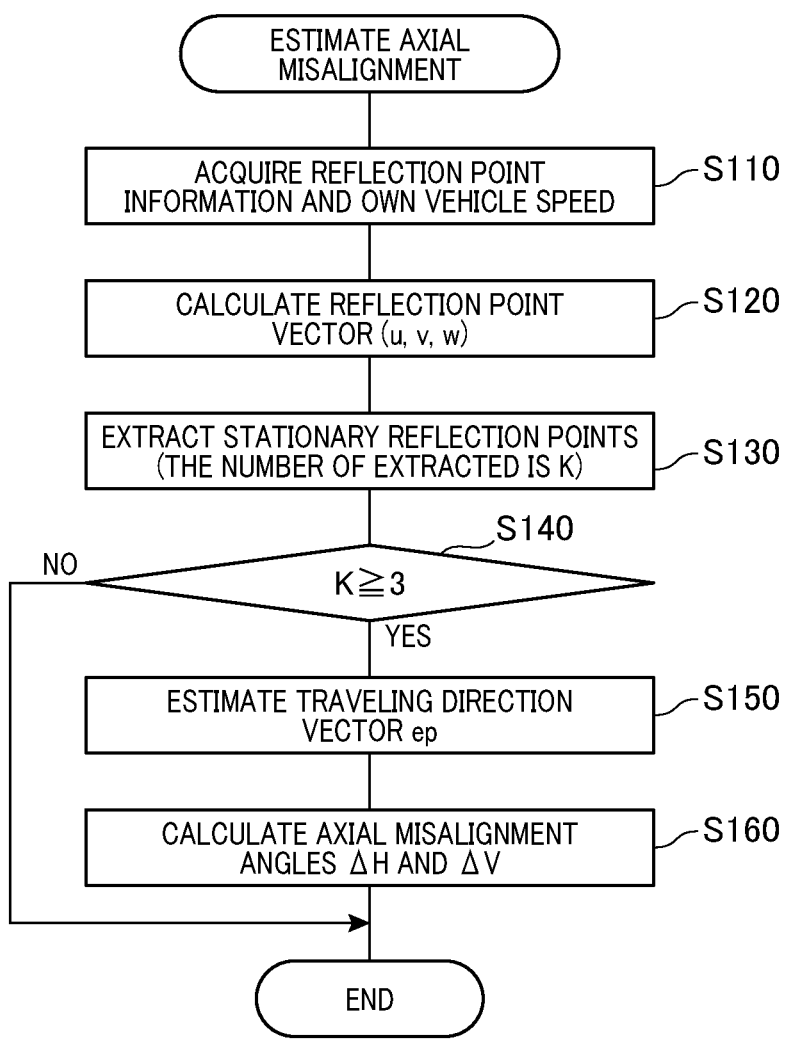
FIG. 2 is a flowchart of an axial-misalignment estimating process.

Referring to the flowchart of FIG. 2, a description will now be given of the axial-misalignment estimating process executed by the signal processing unit 4. The present process is activated for every measurement cycle in which a radar wave is transmitted and received.

When the present process is activated, at step S110, the signal processing unit 4 acquires the reflection point information from the radar device 2, and an own vehicle speed Cm from the in-vehicle sensor group 3. A reflection point identified from the reflection point information is hereinafter referred to as the acquired reflection point.

Figure 3:
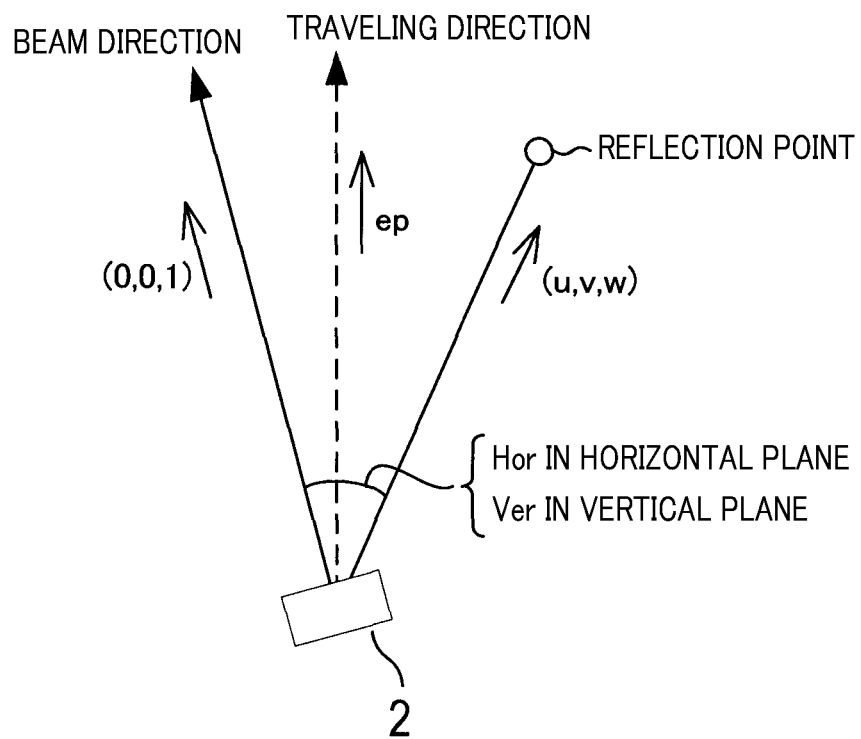
FIG. 3 is a diagram illustrating a relationship among a beam direction of a radar device, a moving direction of a vehicle equipped with the radar device, and a direction in which a reflection point detected by the radar device is present.

At step S120, the signal processing unit 4 converts coordinates on each of acquired reflection points, based on the reflection point information acquired at step S110. Specifically, as illustrated in FIG. 3, the signal processing unit 4 determines three-dimensional coordinates (u,v,w) using Expressions (1) to (3) in which a horizontal angle and a vertical angle included in the reflection point information are respectively represented as Hor and Ver.

[Expression 1]

$$u = \sin(\text{Hor}) \quad (1)$$

$$v = \sin(\text{Ver}) \quad (2)$$

$$w = \sqrt{1 - u^2 - v^2} \quad (3)$$

The three-dimensional coordinates (u,v,w) respectively represent a horizontal distance u and a vertical distance v on a plane orthogonal to the beam direction and a distance w in the beam direction when the distance to the reflection point is assumed to be 1. The three-dimensional coordinates may be a unit vector (hereinafter referred to as reflection point vector) representing a direction in which the reflection point is present as viewed from the radar device 2. In particular, w represents a magnitude of the relative speed in a direction indicated by the reflection point vector, which speed is actually detected by the radar device 2 when the relative speed in the beam direction is assumed to be 1 if the own vehicle and the reflection point are moving in the same direction. w is hereinafter also referred to as Doppler attenuation factor.

At step S130, the signal processing unit 4 extracts stationary reflection points acquired from stationary objects, of the acquired reflection points. Specifically, the signal processing unit 4 uses the own vehicle speed Cm acquired at step S110 to extract, as stationary reflection points, acquired reflection points satisfying Expression (4), in which the relative speed included in the reflection point information is represented as q and a preset threshold is represented as ε. That is, the stationary reflection point refers to an acquired reflection point for which an absolute value of a sum of a ratio of the own vehicle speed Cm to the relative speed q and the Doppler attenuation factor w is smaller than the threshold ε. In this case, the number of extracted stationary reflection points is represented as K.

[Expression 2]

$$|q/Cm+w|<\varepsilon \qquad (4)$$

In other words, if the direction indicated by the reflection point vector (u,v,w) of each stationary reflection point coincides with the beam direction (0, 0, 1), that is, if w=1, the own vehicle speed Cm and the relative speed q of the reflection point are of the same magnitude, and a direction of the relative speed q is opposite to a direction of the own vehicle speed Cm. Thus, q/Cm=−1. If the direction indicated by the reflection point vector of the stationary reflection point fails to coincide with the beam direction, that is, if w≠1, q decreases at a rate corresponding to the Doppler attenuation factor w. Thus, q/Cm=−w.

In other words, in both cases, the reflection point for which the left side of Expression (4) is 0 may be a stationary reflection point. However, the own vehicle speed Cm acquired from the in-vehicle sensor group 3 is not necessarily equal to the actual vehicle speed due to wheel slip or the like. If the beam direction deviates from the traveling direction of the own vehicle, the relative speed q detected by the radar device 2 also varies according to the deviation. Therefore, even if the reflection point is a stationary reflection point, the left side of Expression (4) is not necessarily equal to 0. Thus, the threshold F is appropriately set with the above-described relationship taken into account.

At step S140, the signal processing unit 4 determines whether the number of extracted stationary reflection points K is three or more. If K is three or more, control proceeds to step S150. If K is less than three, the present process is temporarily terminated.

At step S150, the signal processing unit 4 uses Expression (5) to estimate a unit vector (hereinafter referred to as a traveling direction vector) ep representing an actual traveling direction of the own vehicle, and an actual own vehicle speed Cp. Cp is a scalar. Q is a column vector including sequentially arranged relative speeds q of K stationary reflection points, and is expressed by Expression (6). E is a matrix including reflection point vectors of K stationary reflection points expressed as row vectors and sequentially arranged in a column direction, and is expressed by Expression (7). ep is a column vector including a horizontal direction component up, a vertical direction component vp, and a beam direction component wp, and is expressed by Expression (8). Note that |ep|=1.

[Expression 3]

$$Q = E \cdot Cp \cdot ep \qquad (5)$$

$$Q = \begin{bmatrix} q_1 \\ q_2 \\ \vdots \\ q_K \end{bmatrix} \qquad (6)$$

$$E = \begin{bmatrix} u_1 & v_1 & w_1 \\ u_2 & v_2 & w_2 \\ \vdots & \vdots & \vdots \\ u_K & v_K & w_K \end{bmatrix} \qquad (7)$$

$$ep = \begin{bmatrix} up \\ vp \\ wp \end{bmatrix} \qquad (8)$$

In other words, Expression (5) represents K simultaneous equations including a Cp component and ep components as unknown parameters. By solving these simultaneous equations, Cp and ep are determined. ep is composed of three components, but any of the two components can derive the remaining one component. Thus, a total of three unknown parameters including Cp are to be actually determined. Therefore, solving Expression (5) needs three or more stationary reflection points. A description will not be given of a specific solution of the simultaneous equations. By way of example, the least squares method or the like can be used, but the present invention is not limited to this.

Figure 4:
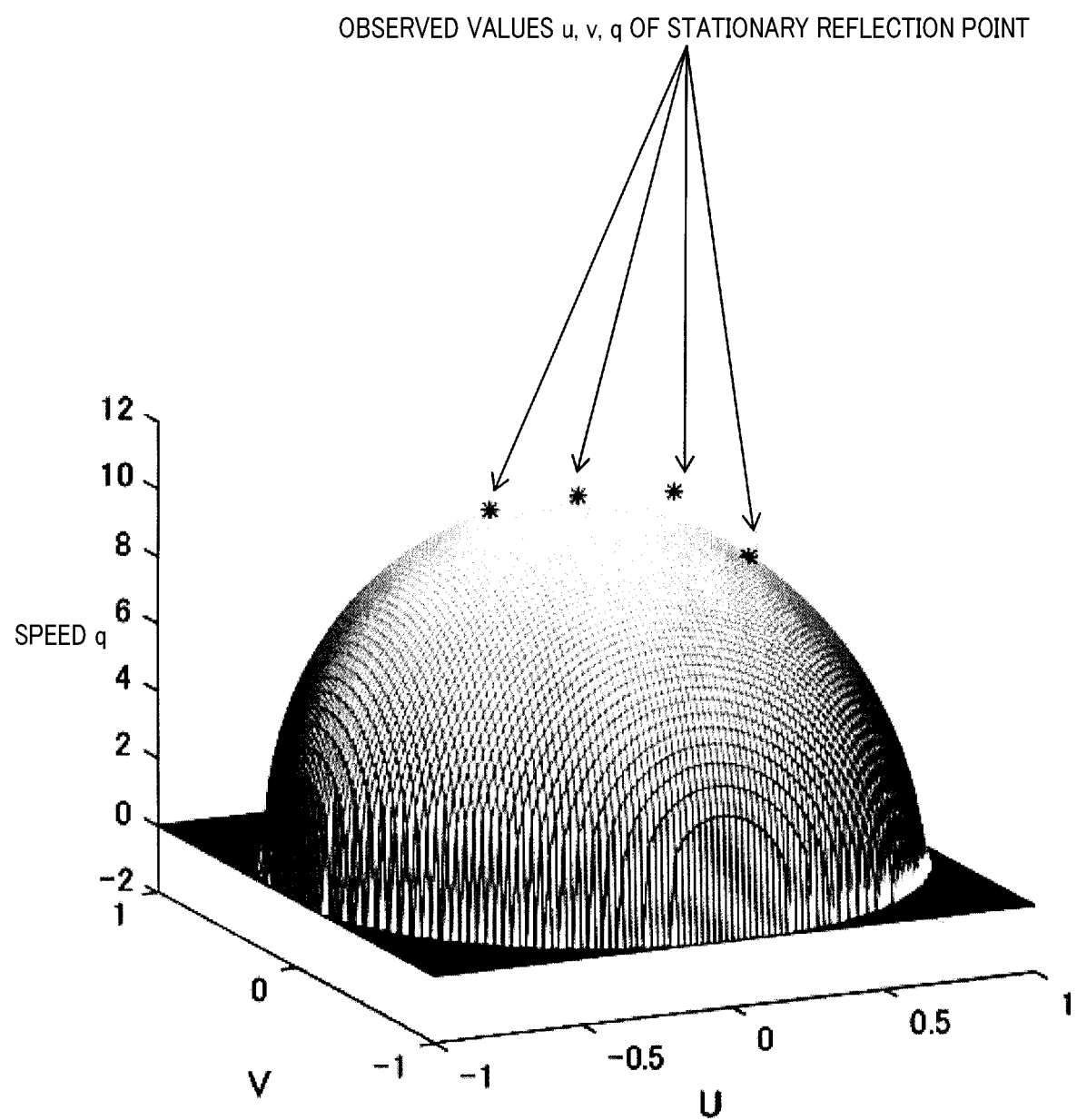
FIG. 4 is a diagram illustrating a relationship among values that may be taken by a reflection point vector, observed values for a stationary reflection point, w-axis coordinates of three-dimensional coordinates, and a relative speed of the reflection point.

FIG. 4 is a graph illustrating a range within which the reflection point vector (u,v,w) is present (that is, the range lies on a hemispherical surface of FIG. 4). A scale of w axis has been converted to represent the relative speed q. Specifically, the scale has been converted such that the own vehicle speed Cm is equal to w=1. If the stationary reflection point u, v, q is plotted in a coordinate system illustrated in FIG. 4, and if the radar device 2 has no axial misalignment and the beam direction coincides with the traveling direction, the stationary reflection point is plotted on the hemisphere. Solving the simultaneous equations corresponds to determining the traveling direction vector and the own vehicle speed, in which all the stationary reflection points are plotted on the hemisphere.

At step S160, the signal processing unit 4 uses Equations (9) and (10) to calculate the axial misalignment angles ΔH and ΔV in the beam direction of the radar device 2 with respect to the traveling direction of the own vehicle, based on the traveling direction vector ep estimated at step S150. Then, the present process is temporarily terminated up is a horizontal direction component of the traveling direction vector ep, and vp is a vertical direction component of the traveling direction vector ep. ΔH is the axial misalignment angle in the horizontal direction, and ΔV is the axial misalignment angle in the vertical direction.

[Expression 4]

$$\Delta H = \arcsin(up) \qquad (9)$$

$$\Delta V = \arcsin(vp) \qquad (10)$$

The axial misalignment angles ΔH and ΔV determined at S160 are used, for example, to correct the reflection point information acquired from the radar device 2. If at least one of the axial misalignment angles ΔH and ΔV exceeds a preset upper limit threshold, an alarm or the like may be raised via the assistance executing unit 5.

3. Effects

The present embodiment described above in detail yields advantageous effects as follows.

(1a) According to the present embodiment, the axial misalignment angles ΔH and ΔV in the horizontal direction and the vertical direction can be simultaneously estimated. Thus, estimation accuracy can be improved.

(1b) According to the present embodiment, Expression (4) is used to extract stationary reflection points. This enables stationary reflection points to be more accurately extracted, and thus allows the axial misalignment angles ΔH and ΔV to be more accurately estimated.

4. Other Embodiments

The embodiment of the present disclosure has been described above, but the present disclosure is not limited to the above-described embodiment and can be carried out in various modes.

(3a) In the above-described embodiment, Expression (4) is used to extract stationary reflection points. However, the present disclosure is not limited to this. For example, information obtained from images, maps, and the like may be utilized for extraction.

(3b) A plurality of functions of one component of the above-described embodiment may be implemented by a plurality of components, or one function of one component may be implemented by plurality of components. Alternatively, a plurality of functions of a plurality of components may be implemented by one component, or one function implemented by a plurality of components may be implemented by one component. Alternatively, a part of the configuration of the above-described embodiment may be omitted. Alternatively, at least a part of the configuration of the above-described embodiment may be added to or replaced by another configuration of the above-described embodiment. The embodiment of the present disclosure should encompass all the modes included in the technical idea specified by the wording of the claims.

(3c) The present disclosure can be implemented in various aspects other than the above-described axial-misalignment estimating device, such as a system including the axial-misalignment estimating device as a component, a program for causing a computer to function as the axial-misalignment estimating device, a non-transitory computer-readable storage medium such as a semiconductor memory in which the program is recorded, an axial-misalignment estimating method, and the like.

The invention claimed is:

1. An axial-misalignment estimating device estimating an axial misalignment angle of a radar device mounted to a moving body, the axial-misalignment estimating device comprising:

an acquiring unit configured to acquire, for each of reflection points detected by the radar device, reflection point information including a horizontal angle and a vertical angle determined relative to a beam direction that is along a center axis of a radar beam from the radar device, and a relative speed of the reflection point relative to the moving body;

a converting unit configured to convert, based on the reflection point information acquired by the acquiring unit, each of the reflection points into three-dimensional coordinates representing a horizontal distance and a vertical distance on a plane orthogonal to the beam direction and a distance in the beam direction when a distance to the reflection point is assumed to be 1, the horizontal and vertical distances being determined from the horizontal angle and the vertical angle;

an extracting unit configured to extract, from the reflection points, stationary reflection points estimated to be stationary objects;

an estimating unit configured to estimate unknown parameters including a traveling direction vector representing a traveling direction of the moving body and a moving speed of the moving body, using a relational expression established between the unknown parameters and the three-dimensional coordinates of each of the stationary reflection points resulting from the conversion by the converting unit and the relative speed of the stationary reflection point acquired by the acquiring unit; and a calculating unit configured to determine axial misalignment angles in a horizontal direction and a vertical direction based on the traveling direction vector included in the unknown parameters estimated by the estimating unit.

2. The axial-misalignment estimating device according to claim 1, wherein the extracting unit is configured to use, as a Doppler attenuation factor, the distance in the beam direction resulting from the conversion by the converting unit, to extract, as each of the stationary reflection points, the reflection point for which an absolute value of a sum of a ratio of the moving speed of the moving body to the relative speed and the Doppler attenuation factor is smaller than a preset threshold.

3. The axial-misalignment estimating device according to claim 1, wherein the estimating unit is configured to estimate the unknown parameters if the number of the stationary reflection points detected by the extracting unit is three or more.

4. The axial-misalignment estimating device according to claim 1, wherein the estimating unit is configured to estimate the unknown parameters using a least squares method.

* * * * *